United States Patent
Kobayashi

(10) Patent No.: US 6,672,181 B2
(45) Date of Patent: Jan. 6, 2004

(54) LUBRICATION MECHANISM FOR A WAVE GEAR DEVICE

(75) Inventor: Masaru Kobayashi, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 16 days.

(21) Appl. No.: 10/150,963

(22) Filed: May 21, 2002

(65) Prior Publication Data

US 2002/0178861 A1 Dec. 5, 2002

(30) Foreign Application Priority Data

May 23, 2001 (JP) .................................. 2001-154331

(51) Int. Cl.[7] .............................................. F16H 33/00
(52) U.S. Cl. ......................................................... 74/640
(58) Field of Search .......................... 74/640, 461, 462, 74/464; 475/162; 184/6.12

(56) References Cited

U.S. PATENT DOCUMENTS

| | | | | |
|---|---|---|---|---|
| 3,407,902 A | * | 10/1968 | Musser | ........................ 74/640 |
| 4,825,720 A | * | 5/1989 | Cpdepuy | ..................... 74/640 |
| 5,934,157 A | * | 8/1999 | Kobayashi et al. | ........... 74/640 |
| 5,984,048 A | * | 11/1999 | Kiyosawa et al. | ......... 74/640 X |
| 6,065,362 A | * | 5/2000 | Kiyosawa et al. | ............ 74/460 |

FOREIGN PATENT DOCUMENTS

JP          409250609    *  9/1997

* cited by examiner

*Primary Examiner*—Roger Pang
(74) *Attorney, Agent, or Firm*—Burns, Doane, Swecker & Mathis, L.L.P.

(57) ABSTRACT

According to a lubrication mechanism for a wave gear device 1, frictionally contacting parts 5 of toothed parts of gears 2 and 3 are lubricated using a lubricant with a high base oil viscosity and favorable shear stability. Frictionally contacting parts 7 of the external gear 3 and wave generator 4 and frictionally contacting parts 9 on the inside of wave bearing 42 are respectively lubricated using solid lubricants 8 and 10 that are produced by mixing a low base oil viscosity grease with a resin with low deformation resistance and hardening the mixture by heating. In this way, the lubrication life is extended without causing decreases in the efficiency of the wave gear device.

8 Claims, 3 Drawing Sheets

LUBRICATION MECHANISM FOR A WAVE GEAR DEVICE

BACKGROUND OF THE INVENTION

1. Field of the Invention

The present invention relates to a lubrication mechanism for a wave gear device, and in particular to a lubrication mechanism for a wave gear device that prolongs the lubrication life.

2. Related Art

A typical wave gear device comprises a ring-shaped rigid internal gear, a flexible external gear that is shaped like a cup and is disposed on an inside of the rigid internal gear, and a wave generator for flexing the flexible external gear elliptically so that the flexible external gear engages the internal gear and moving engaging positions of the two gears in a circumferential direction. The number of teeth in the two gears usually differs by two, so that the engaging positions of the gears move in the circumferential direction and the two gears rotate relative to each other. Since the internal gear is fixed, rotating the wave generator at high speed using a high-speed rotational driving source, such as a motor, results in a rotational output of significantly reduced speed being obtained from the external gear.

The wave gear device has frictionally contacting parts to be lubricated that include the engaging toothed surfaces of the two gears, frictionally contacting parts of the external gear and the wave generator, frictionally contacting parts within the wave generator, and the like. Usually, the same type of lubricant is supplied to all of these parts.

The nature of the frictional contact at each of these lubricated parts differs, however, so that the desirable properties for the lubricants used at such lubricated parts also differ. With a conventional lubrication mechanism where the same type of lubricant is used to lubricate each lubricated part of a wave gear device, lubrication problems occur at some lubricated parts before others. This limits the lubrication life of the wave gear device as a whole.

SUMMARY OF THE INVENTION

The present invention has a main object of providing a lubrication mechanism for a wave gear device that can prolong the lubrication life of the wave gear device.

To achieve the above and other objects, the present invention is a lubrication mechanism for a wave gear device, the wave gear device including: a ring-shaped rigid internal gear; a ring-shaped flexible external gear; and a wave generator for flexing the external gear in a radial direction and has the external gear partially engage the internal gear, and for moving engaging parts of the internal gear and the external gear in a circumferential direction, the lubrication mechanism including: grease that fills toothed parts of the internal gear and the external gear; and a solid lubricant that is attached to frictionally contacting parts within the wave generator and to frictionally contacting parts of the external gear and the wave generator.

The grease should preferably have a base oil viscosity of 68 mm²/s (at 40° C.) and a worked penetration (at 25° C.) in a range of 220 to 295.

The solid lubricant should preferably be produced by mixing a grease with a resin and hardening the mixture by heating.

The solid lubricant may also be fixed to an inner circumferential surface of the external gear that contacts the wave generator.

Since the wave generator includes a rigid wave plug, a wave bearing that is fitted between an outer circumferential surface of the wave plug and an inner circumferential surface of the external gear, and a retainer for the wave bearing, the solid lubricant may be fixed to the retainer.

With the lubrication mechanism for a wave gear device according to the present invention, the frictionally contacting parts of the engaging toothed parts of the two gears are filled with grease that has a high base oil viscosity and favorable shear stability (i.e., a lubricant suited to these parts). Also, at the frictionally contacting parts on the inside of the wave generator and the frictionally contacting parts between the wave generator and the external gear, solid lubricant with low base oil viscosity and low deformation resistance (i.e., a different lubricant suited to these parts) is used. By doing so, the lubrication life can be prolonged without degrading the efficiency of the wave gear device.

DESCRIPTION OF THE PREFERRED EMBODIMENT

The following describes, with reference to the attached drawings, a cup-shaped wave gear device to which the present invention has been applied.

Figure 1:
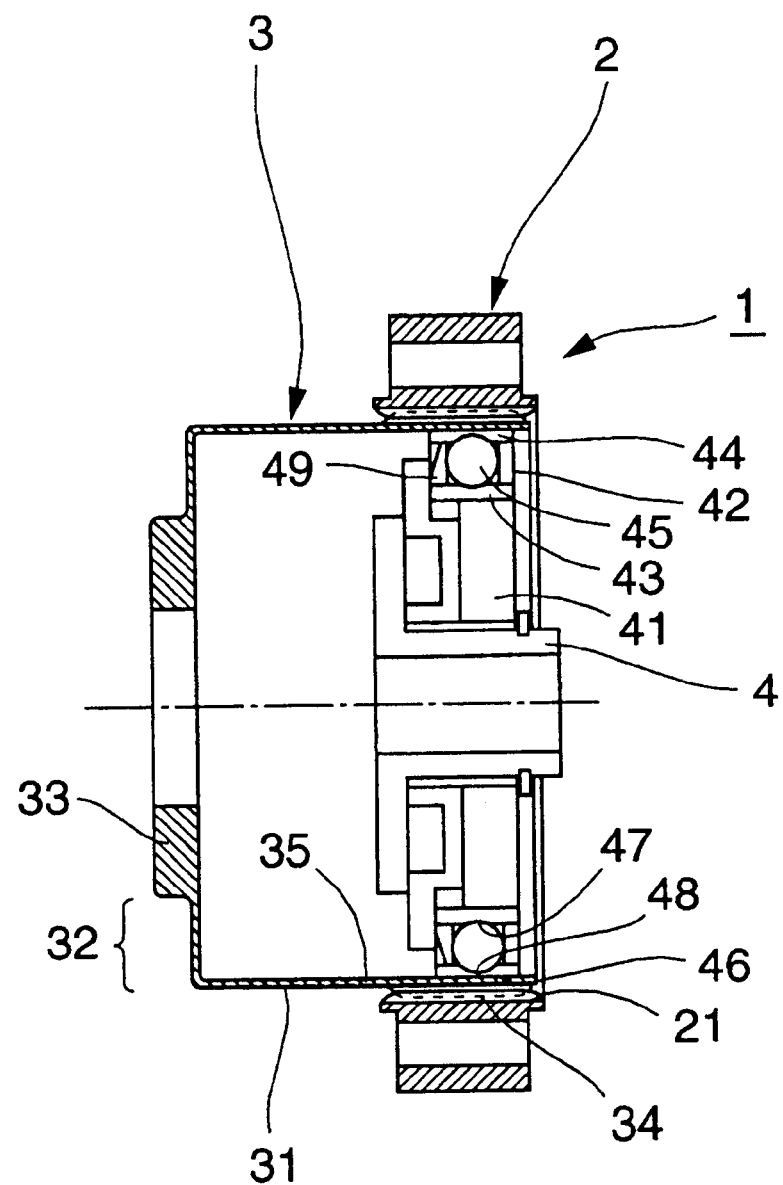
FIG. 1 is a longitudinal sectional view showing one example of a cup-shaped wave gear device in which the lubrication mechanism of the present invention has been incorporated.
Figure 2:
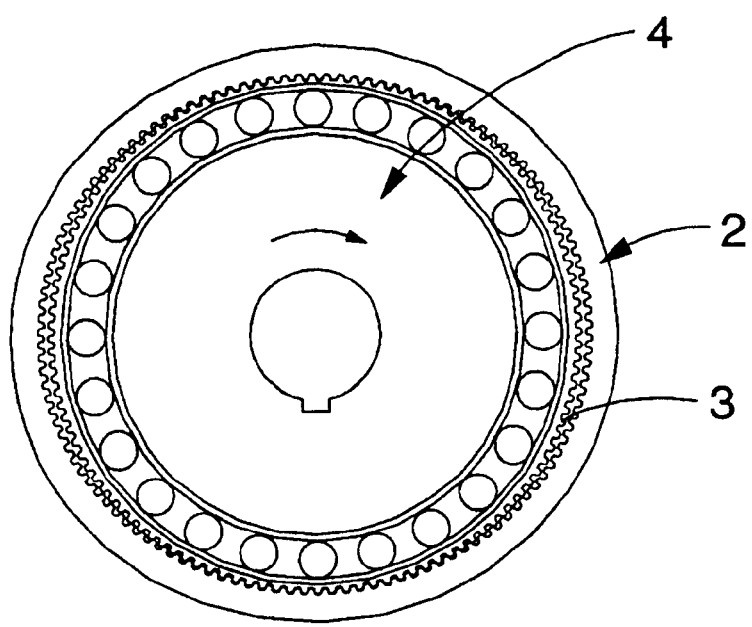
FIG. 2 is a frontal view of the wave gear device of FIG. 1.

FIG. 1 and FIG. 2 are respectively a longitudinal sectional view and a frontal view showing a cup-shaped wave gear device to which the present invention can be applied. As shown in these drawings, the cup-shaped wave gear device 1 of the present embodiment is composed of a ring-shaped rigid internal gear 2, a cup-shaped flexible external gear 3 that is disposed on an inside of the rigid internal gear 2, and a wave generator 4 that has an elliptical outline and is fitted into the flexible external gear 3.

The cup-shaped flexible external gear 3 is provided with a cylindrical trunk part 31, a ring-shaped diaphragm 32 that extends in a radial direction from the edge of an opening at one end of the trunk part 31, a ring-shaped boss 33 that is integrally formed with an inner circumference of the diaphragm 32, and external teeth 34 that are formed in an outer circumferential surface of an opening at the other end of the trunk part 31. The external teeth 34 can engage internal teeth 21 of the rigid internal gear 2.

The wave generator 4 has a rigid wave plug 41 that has an elliptical outline and a wave bearing 42 that fits onto an outer circumference of the wave plug 41. The wave bearing 42 is composed of an inner ring 43 that fits onto an outer circumferential surface of the wave plug 41, an outer ring 44 that fits into a trunk part inner circumferential surface 35 of the flexible external gear 3, balls 45 that are inserted so as to be free to roll between the inner ring 43 and the outer ring 44, and a retainer 49 that holds the balls 45 at a predetermined position but allows the balls 45 to rotate freely. In more detail, an outer circumferential surface 46 of the outer ring 44 is in frictional contact with the trunk part inner circumferential surface 35 of the external gear 3. A rolling contact surface 47 having a circular-arc cross section is formed in the outer circumferential surface of the inner ring 43, and a rolling contact surface 48 having a circular-arc cross section is formed in the inner circumferential surface of the outer ring 44. The balls 45 are in frictional contact with the rolling contact surfaces 47 and 48.

The wave generator 4 flexes the part of the flexible external gear 3 in which the external teeth are formed into an elliptical shape, with the external teeth 34 engaging the parts of the internal teeth 21 at positions at both ends of the major axis of the ellipse. When the wave generator 4 is rotationally driven by a motor or the like, the engaging parts of the gears 2 and 3 move in a circumferential direction. A difference in the number of teeth between the gears 2 and 3 causes a relative rotation of the gears 2 and 3. This difference in the number of teeth is usually set at two, and the rigid internal gear 2 is usually fixed to a device housing or the like, so that a rotational output of a speed that is significantly reduced in accordance with the difference in the number of teeth is obtained from the flexible external gear 3.

In this embodiment, the internal gear 2 may be formed from a high-strength aluminum alloy or a copper alloy. The external gear 3 may be formed of structural steel or stainless steel. The outer ring 44 of the wave bearing 42 of the wave generator 4 may be formed of SUJ2, stainless steel, or beryllium copper. The inner ring 43 may also be formed of SUJ2, stainless steel, or beryllium copper, and the balls 45 may be formed of a ceramic material ($Si_3N_4$).

Figure 3:
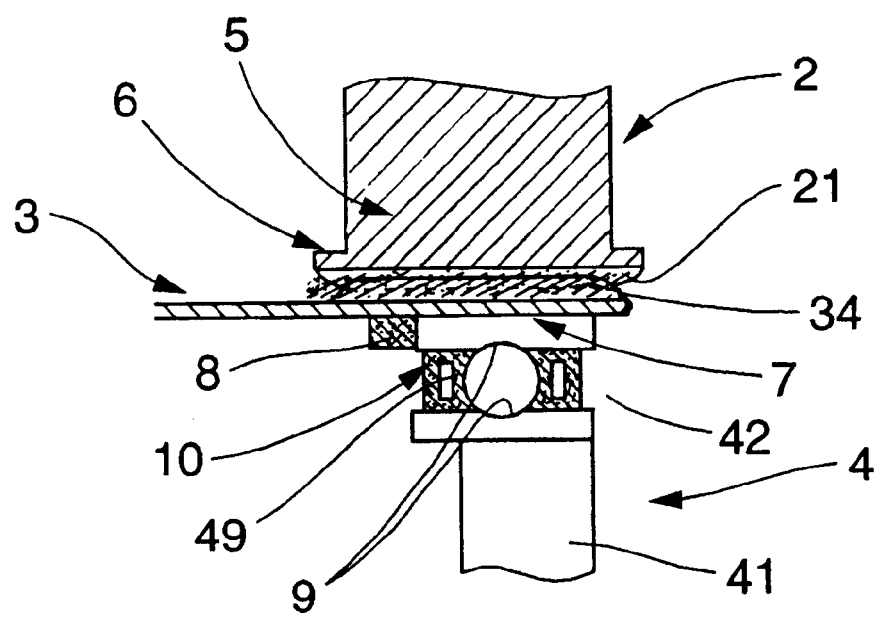
FIG. 3 is an explanatory view showing the lubrication mechanism of the wave gear device shown in FIG. 1.

The following describes, with reference to FIG. 3, a lubrication mechanism for the wave gear device 1 of the present embodiment whose configuration has been described above. The frictionally contacting parts of the engaging toothed parts of the internal gear 2 and the external gear 3 are filled with a grease 6 that has a high base oil viscosity and favorable shear stability. As one example, a grease whose base oil viscosity is 68 $mm^2$/s (at 40° C.) (JISK 2220) and whose worked penetration (at 25° C.) is in a range of 220 to 295 (that is to say, a grease whose NLGI grease worked penetration is in a range of 2 to 3) is preferable. On the other hand, to lubricate the frictionally contacting parts 7 of the external gear 3 and the wave generator 4, a solid lubricant 8 is fixed to a part of the trunk part inner circumferential surface 35 that is adjacent to these parts 7. Also, to lubricate the frictionally contacting parts 9 of the wave bearing 42, a solid lubricant 10 is fixed to the retainer 49.

A lubricant produced by mixing a low base oil viscosity grease with a resin with a low deformation resistance and hardening the mixture by heating may be preferably used as the solid lubricants mentioned above.

As described above, with the lubrication mechanism for a wave gear device according to the present invention, the frictionally contacting parts of the engaging toothed parts of the two gears are filled with a grease that has a high base oil viscosity and favorable shear stability. At such parts, the external gear is repeatedly flexed and engages the internal gear. Such flexing expels the lubricant from the toothed parts, so that it becomes easy for such parts to become insufficiently lubricated. On the other hand, with the present invention, a lubricant with a high base oil viscosity and favorable shear stability is used, which can prevent the grease from being expelled from the lubricated parts, resulting in insufficient lubrication.

If the frictionally contacting parts on the inside of the wave generator and the frictionally contacting parts between the wave generator and the external gear were also filled with a highly viscose lubricant, the agitating resistance of the lubricant would be high, increasing the power loss and lowering the overall efficiency of the wave gear device. However, according to the present invention, solid lubricants are disposed at these parts so that the parts can be lubricated without causing problems such as losses in power.

For the reasons given above, the present invention provides a lubrication mechanism for a wave gear device that can increase the lubrication life without deteriorating the efficiency of the wave gear device.

What is claimed is:

1. A lubrication mechanism for a wave gear device, the wave gear device including:

a ring-shaped rigid internal gear;

a ring-shaped flexible external gear; and a wave generator for flexing the external gear in a radial direction and has the external gear partially engage the internal gear, and for moving engaging parts of the internal gear and the external gear in a circumferential direction, the lubrication mechanism comprising:

grease that fills toothed parts of the internal gear and the external gear; and a solid lubricant that is attached to frictionally contacting parts within the wave generator and adjacent to frictionally contacting parts of the external gear and the wave generator.

2. A lubrication mechanism for a wave gear device according to claim 1, wherein the grease has a base oil viscosity of 68 $mm^2$/s (at 40° C.) and a worked penetration (at 25° C.) in a range of 220 to 295.

3. A lubrication mechanism for a wave gear device according to claim 1, wherein the solid lubricant is produced by mixing a grease with a resin and hardening the mixture by heating.

4. A lubrication mechanism for a wave gear device according to claim 1, wherein the solid lubricant is fixed to an inner circumferential surface of the external gear that contacts the wave generator.

5. A lubrication mechanism for a wave gear device according to claim 1, wherein the wave generator includes a rigid wave plug, a wave bearing that is fitted between an outer circumferential surface of the wave plug and an inner circumferential surface of the external gear, and a retainer for the wave bearing, and the solid lubricant is fixed to the retainer.

6. A lubrication mechanism for a wave gear device according to claim 2, wherein the solid lubricant is produced by mixing a grease with a resin and hardening the mixture by heating.

7. A lubrication mechanism for a wave gear device according to claim 2, wherein the solid lubricant is fixed to an inner circumferential surface of the external gear that contacts the wave generator.

8. A lubrication mechanism for a wave gear device according to claim 2, wherein the wave generator includes a rigid wave plug, a wave bearing that is fitted between an outer circumferential surface of the wave plug and an inner circumferential surface of the external gear, and a retainer for the wave bearing, and the solid lubricant is fixed to the retainer.

* * * * *